(12) United States Patent
Rasidescu et al.

(10) Patent No.: US 6,851,691 B2
(45) Date of Patent: Feb. 8, 2005

(54) SUSPENSION SYSTEM FOR AN ALL TERRAIN VEHICLE

(75) Inventors: Mihai Rasidescu, Sherbrooke (CA); Roger Rioux, Magog (CA); Vincent Morin, Canton de Brompton (CA); Alessandro Del Mistro, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 17 days.

(21) Appl. No.: 09/932,971

(22) Filed: Aug. 21, 2001

(65) Prior Publication Data

US 2002/0024192 A1 Feb. 28, 2002

Related U.S. Application Data

(60) Provisional application No. 60/226,678, filed on Aug. 22, 2000.

(51) Int. Cl.$^7$ .................................................. B60G 3/18
(52) U.S. Cl. ................................................. 280/124.35
(58) Field of Search ................... 280/124.135, 124.137, 280/124.128, 124.166, 124.168, 124.164, 781, 786, 787, 798; 180/311, 312, 210

(56) References Cited

U.S. PATENT DOCUMENTS

| | | | | |
|---|---|---|---|---|
| 2,256,069 A | * | 9/1941 | Wagner | 267/284 |
| 3,386,778 A | * | 6/1968 | Rymes | 305/134 |
| 3,469,649 A | * | 9/1969 | Hoyt et al. | 180/352 |
| 3,473,821 A | * | 10/1969 | Barenyi et al. | 280/124.111 |
| 4,770,262 A | * | 9/1988 | Yasunaga et al. | 180/68.1 |
| 6,241,262 B1 | * | 6/2001 | Suess | 280/5.522 |
| 6,471,226 B1 | * | 10/2002 | Klaas | 280/124.128 |

* cited by examiner

Primary Examiner—Faye M. Fleming
(74) Attorney, Agent, or Firm—BRP Legal Services (57) ABSTRACT

A suspension system for an ATV is provided that includes a torsion control mechanism having a left connecting structure and a right connecting structure. The torsion control mechanism defines an axis of rotation passing through the left and right connecting structures. A left swing arm is fixedly connected to the left connecting structure and a right swing arm is fixedly connected to the right connecting structure, such that the right and left swing arms are pivotable about the rotation axis defined by the torsion control mechanism.

40 Claims, 12 Drawing Sheets

SUSPENSION SYSTEM FOR AN ALL TERRAIN VEHICLE

CROSS-REFERENCE

This application claims priority to U.S. Provision Patent Application No. Ser. 60/226,678, titled "SUSPENSION SYSTEM FOR AN ALL TERRAIN VEHICLE", filed Aug. 22, 2000.

BACKGROUND OF THE INVENTION

1. Field of the Invention

This invention relates to an all-terrain vehicle (ATV), and more particularly to an ATV having an improved suspension system.

2. Description of Related Art

ATVs are generally operated in fairly rough terrain or, at least, must be capable of operating in rough terrain. Therefore, in addition to the obvious requirement of providing a smooth ride, suspension systems for ATVs must be strong and allow for a relatively large amount of wheel travel.

Wheel travel is provided in an ATV, among other things, by utilizing relatively long suspension arms. Long suspension arms allow the wheels to move relative to the frame within a large arc with the pivot point provided by suspension arm mounts on the frame. Shorter suspension arms do not provide adequate wheel travel for ATV applications. Furthermore, the necessary handling characteristics of an ATV also necessitate relatively long suspension arms. In particular, during wheel travel, wheels connected to the suspension arms move horizontally, as well as vertically, due to the pivotal nature of the movement. Specifically, for a swing arm or trailing arm configuration, the wheels move horizontally in forward and rearward directions (longitudinally relative to the ATV) during wheel travel and for an A-arm configuration, the wheels move horizontally in inward and outward directions (transversely relative to the vehicle). Shorter suspension arms maximize this horizontal movement such that the wheel base length of the vehicle or lateral spacing of the wheels (depending of the type of suspension configuration) varies greatly over the range wheel travel. In contrast, longer suspension arms reduce this horizontal wheel travel, such that the wheel base length of the vehicle of the lateral spacing of the wheels remain substantially constant through the range of wheel travel.

Additionally, a great deal of ground clearance is preferable to allow traversal of rough terrain. The long suspension arms of an ATV allow the sprung portion of the ATV (those components of the ATV that are attached to the frame) to be disposed relatively high above the ground. Typically, the suspension arms depend somewhat from the suspension arm mounts on the frame to increase the ground clearance. Furthermore, sprung components are usually disposed above a lower most portion of the frame to prevent hang-ups of these components while traversing rough terrain.

Figure 1:
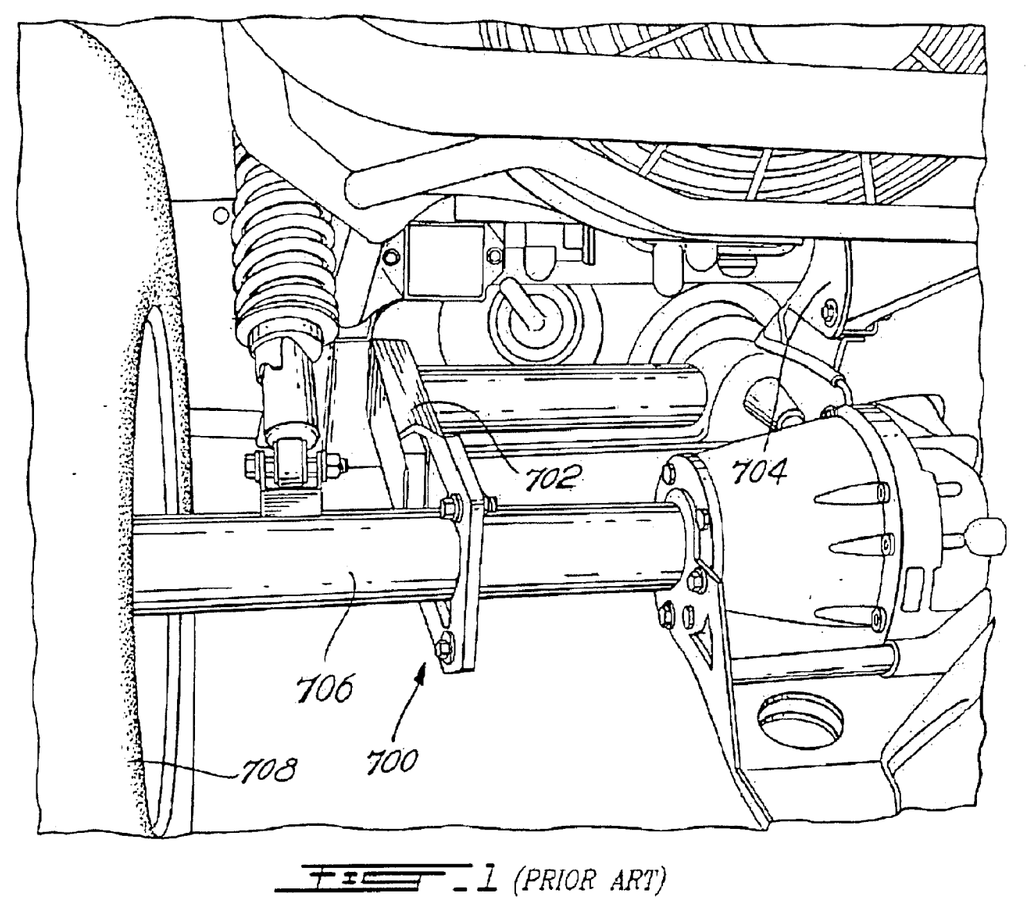
FIGS. 1–3 illustrate prior art suspension systems.

There are several types of ATV suspension systems, which have been designed to meet the specialized criterion. One type, shown in FIG. 1, is a fully dependent type suspension system indicated at 700. This suspension system includes a single rigid swing arm 702 pivotally mounted to a frame 704 on one end thereof and rigidly mounted to a single rigid axle 706 on an opposite end thereof. As shown in FIG. 1, a left side wheel 708 is connected to a left end of the axle 706 and a right side wheel (not shown) is connected to a right end of the axle 706.

This type of suspension system is simple in design and relatively inexpensive to manufacture. However, since the axle 706 and swing arm 702 are rigid, both wheels move in response to terrain acting on either wheel. As such, this type of suspension system provides a relatively rough ride.

Alternatively, to improve rider comfort, other known types of suspension systems have been designed with independence of movement between forward or rearward pairs of suspension arms. This type of system allows each wheel of the respective pair to move independently from the other wheel, thereby providing a smoother ride. One such type of suspension system is a double A-arm or double-wishbone suspension system. However, this type of suspension system is complex and highly costly to manufacture.

Figure 2:
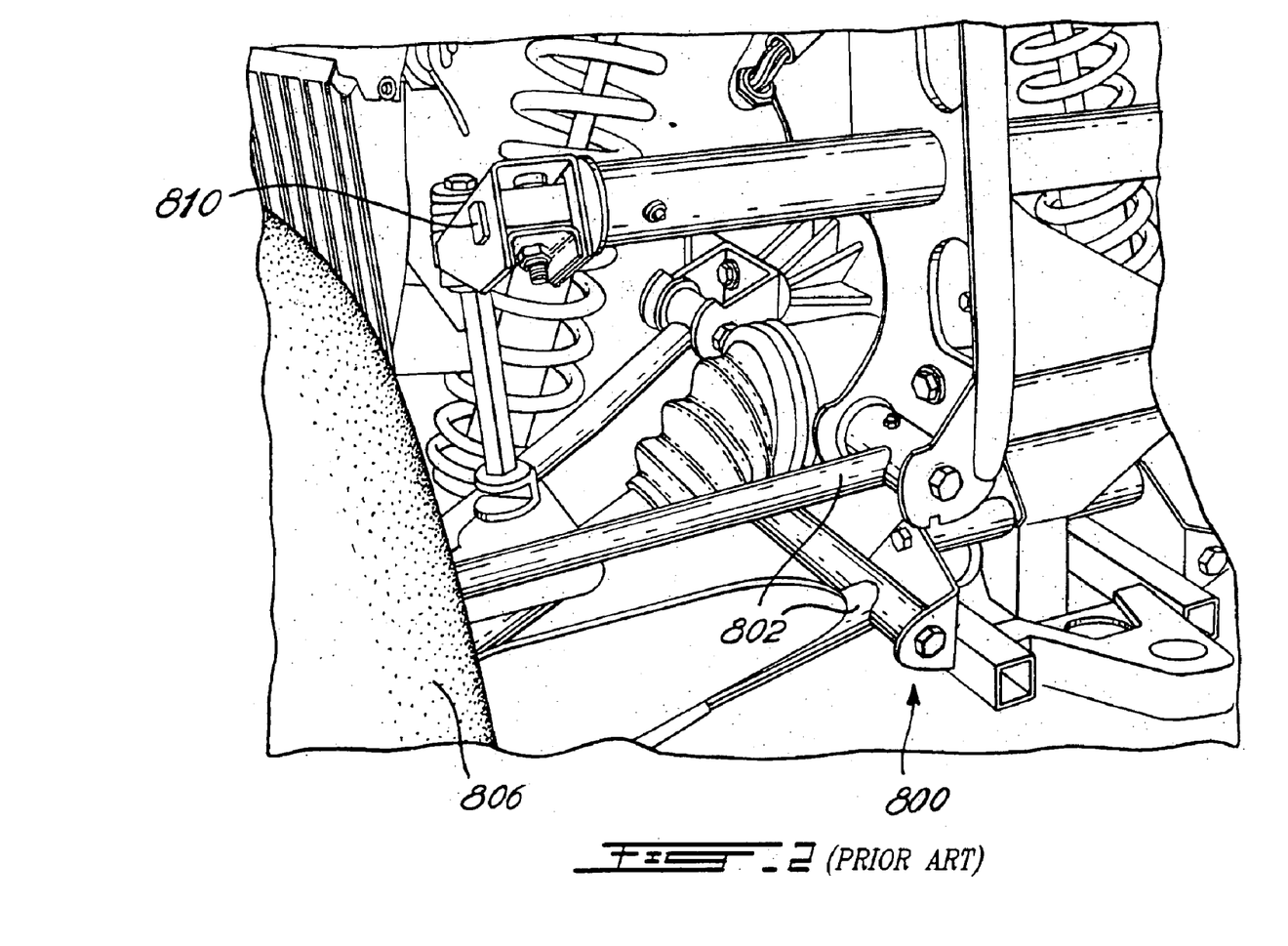
Figure 3:
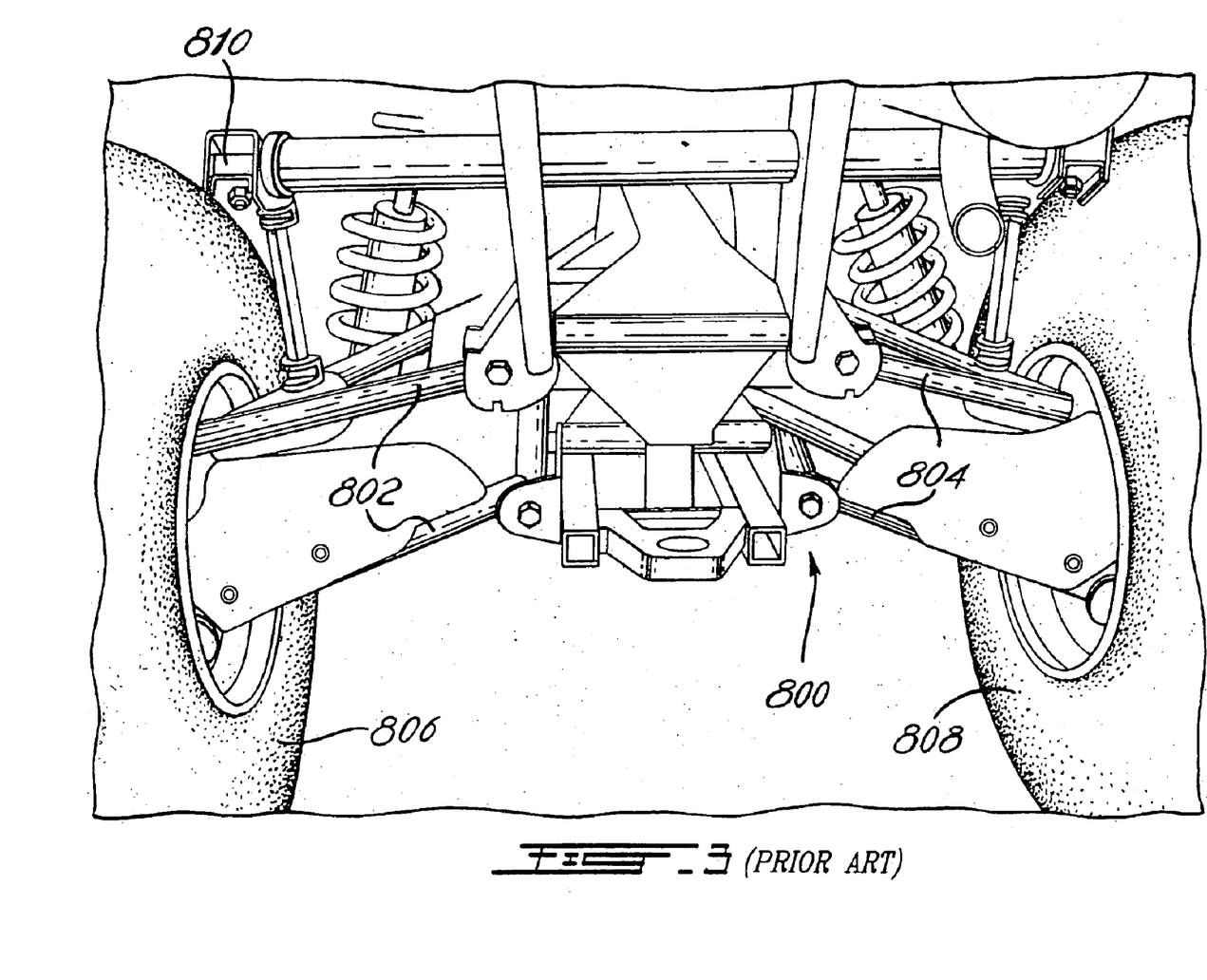

One other type of suspension system is a semi-independent type, such as shown at 800 in FIGS. 2 and 3. As shown, this system includes left and right pairs of A-arms 802, 804. Additionally, the system 800 includes a stabilizer bar 810, which is shown connecting at ends thereof to an upper A-arm of each pair of A-arms 802, 804 and extends therebetween. The stabilizer bar 810 is torsionally deflected by relative movement between the pairs of A-arms 802, 804. The torsional deflection of the stabilizer bar 810 allows the pairs of A-arms 802, 804 a degree of virtually independent movement. However, the stabilizer bar 810 develops a degree of torsional stiffness once deflected to a certain point and, at such time, further movement of one of the pairs of A-arms 802, 804 imparts a corresponding movement of the other pair of A-arms 802, 804. In this manner, the A-arm pairs 802, 804 are allowed virtually independent movement over a range and beyond this range move dependently. This type of system prevents excessive roll movement of the ATV during maneuvering, which is problematic with fully independent suspension systems. However, as with the fully independent system, the semi-independent suspension system, as shown in FIGS. 2 and 3, are complex and costly to manufacture.

Furthermore, to date, there has not been a suspension system developed for an ATV that is adjustable in the degree of dependence provided between respective suspension arms. This feature would be advantageous since desired handling characteristics for one terrain situation or one particular rider may not be suitable or comfortable for another terrain condition or rider.

SUMMARY OF THE INVENTION

It is one aspect of the invention to provide a suspension system that meets the specific requirements for ATV application and that overcomes the deficiencies noted above with respect to the suspension systems of prior art ATVs.

It is another aspect of the invention to provide an ATV with a suspension system that has few parts and is easy to manufacture and assemble.

It is yet another aspect of the invention to provide a suspension system that allows adjustment of the dependency of the swing arms.

According to one preferred embodiment of the invention, there is provided a suspension system including a torsion control mechanism having a left connecting structure and a right connecting structure. The torsion control mechanism defines an axis of rotation passing through the left and right connecting structures. A left swing arm is fixedly connected to the left connecting structure and a right swing arm is fixedly connected to the right connecting structure, such that the right and left swing arms are pivotable about the rotation axis defined by the torsion control mechanism.

According to another preferred embodiment of the invention, a suspension system is provided for an ATV with forward and rearward pairs of wheel assemblies. A wheel base length of the ATV is defined as the distance between rotation axes of the respective pairs of wheel assemblies. The suspension system includes a pair of swing arms, each which has one end thereof pivotally connectable to a frame of the ATV for pivotal movement about a laterally extending pivot axis. The swing arms have opposite ends, each of which are rotationally coupled to respective wheel assembly of one of the forward and rearward pairs of wheel assemblies. A length of each swing arm is defined as the distance between the pivot axis of the swing arm and a rotation axis of the respective wheel assembly. A ratio of the swing arm length to the wheel base length ranges from 0.20 to 0.40.

According to yet another preferred embodiment of the invention, a suspension system is provided for an ATV. The suspension system includes left and right swing arms pivotally connectable to a frame of the ATV. The suspension system includes a swing arm mounting structure rigidly mountable to the frame. The swing arms being pivotally connected to respective ends of the swing arm mounting structure for pivotal movement about a laterally extending pivot axis. The suspension mounting structure is mountable to the frame such that the pivot axis will be disposed above a lower most portion of the frame.

It is another aspect of the present invention is to provide an ATV with a suspension system.

According to another exemplary embodiment of the invention, an ATV is provided that includes a frame and a suspension system coupled to the frame. The suspension system includes a torsion control mechanism having a left connecting structure and a right connecting structure. The torsion control mechanism defines an axis of rotation passing through the left and right connecting structures. The suspension system also includes a left swing arm fixedly connected to the left connecting structure and a right swing arm fixedly connected to the right connecting structure. The right and left swing arms are pivotable about the rotation axis defined by the torsion control mechanism.

According to another embodiment of the present invention, an ATV is provided that includes a generally longitudinally extending frame and forward and rearward pairs of wheel assemblies, which are longitudinally spaced from one another. Each of the pairs of wheel assemblies define a laterally extending rotation axis about which wheels of the respective pair of forward and rearward wheel assemblies rotate. The ATV also includes a suspension system including a pair of swing arms. Each of the swing arms have one end thereof pivotally connected to the frame for pivotal movement about a laterally extending pivot axis. Opposite ends of the swing arms are rotationally coupled to respective wheel assemblies of one of the forward and rearward pairs of wheel assemblies. A length of each swing arm is defined as the distance between the pivot axis of the swing arm and the rotation axis of the respective wheel assembly and a wheel base length of the ATV is defined as the distance between the rotation axes of the forward and rearward pairs of wheel assemblies. A ratio of the swing arm length to the wheel base length ranges from 0.20 to 0.40.

According to yet another embodiment of the present invention, an ATV is provided that includes a generally longitudinally extending frame having a lower supporting portion and an upper supporting portion and a suspension system having left and right swing arms pivotally connected to the lower supporting portion. The suspension system includes a swing arm mounting structure rigidly mounted to the lower supporting portion. The swing arms are pivotally connected to respective ends of the suspension mounting structure for pivotal movement about a laterally extending pivot axis. The suspension mounting structure is positioned on the lower supporting portion such that the pivot axis is disposed above a lower most portion of the lower supporting portion.

These and other aspects, features, and advantages of this invention will be described in or become apparent from the following detailed description when taken in conjunction with the accompanying drawings, which are a part of this disclosure and which illustrate, by way of example, the principles of this invention.

BRIEF DESCRIPTION OF THE DRAWINGS

Preferred embodiments of the invention will be described with reference to the following drawings, in which.

DETAILED DESCRIPTION OF PREFERRED EMBODIMENTS

Figure 4:
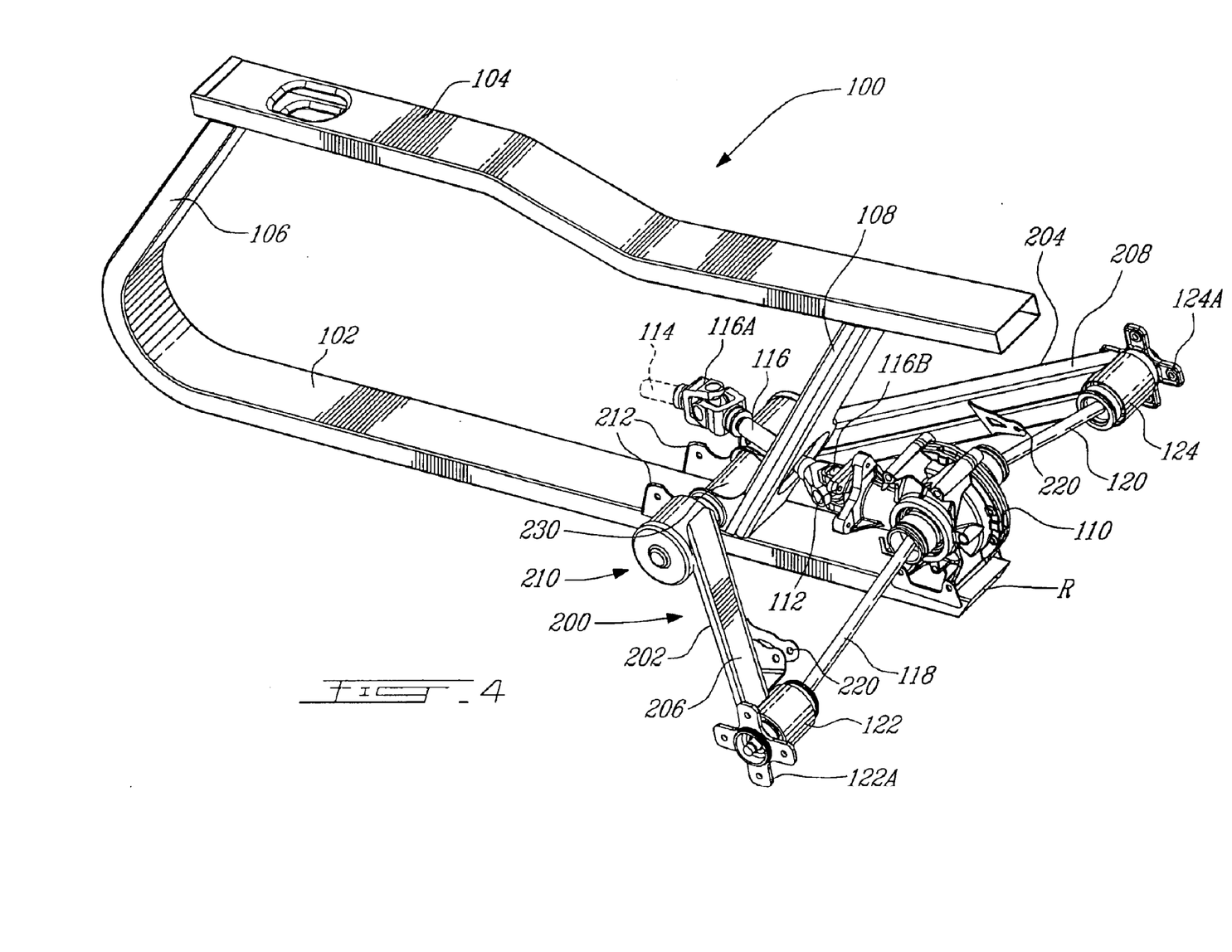
FIG. 4 is a perspective view illustrating a suspension system mounted on a frame of an ATV according to one embodiment of the invention.

FIG. 4 illustrates a suspension system 200 mounted on a frame 100 of an ATV according to one embodiment of the invention. Other frame configurations may, of course, be used. The frame 100 is preferably of the type disclosed in U.S. patent application Ser. No. 09/824,878; the entirety of the same is hereby incorporated by reference. In this particular embodiment, the frame 100 includes a lower support portion 102 and an upper support portion 104. The lower support portion 102 and the upper support portion 104 of the frame 100 may be connected by one or more transverse members 106, 108. The lower support portion 102 towards a rear R of the frame 100 provides a support for a differential or gear box 110 having an input shaft 112 that is provided with motive power from an output shaft 114 (shown in phantom) of an engine (not shown). The output shaft 114 of the engine is coupled to the input shaft 112 of the differential 110 using a drive shaft 116. To compensate for angular misalignment of the shafts 112, 114, and 116, a pair of universal joints 116A and 116B are attached at respective ends of the drive shaft 116. The differential 110 includes a pair of half shafts 118, 120 that provide power to a left wheel and a right wheel of an ATV, respectively. The half-shafts 118, 120 may include universal joints and/or plunging joints to allow for movement of the half-shafts during suspension travel. Each wheel (shown schematically in FIG. 7) includes a tire and a rim assembly. The rim assemblies are coupled to respective hubs 122, 124. Each hub includes a spider 122A, 124A that is connected to the respective rim assembly with a plurality of fasteners (e.g., bolts).

Additionally, a suspension system 200 is shown in FIG. 4 mounted to a rear portion of the frame 100 and in cooperation with the differential 110. As shown, the suspension system 200 provides the hubs 122, 124 to which respective rear wheels are coupled. The suspension system 200 includes a left arm assembly 202 and a right arm assembly 204. Left and right arm assemblies 202, 204 include respective left and right swing arms 206, 208. The swing arms 206, 208 are connected to respective ends of a torsion control mechanism 210. The torsion control mechanism 210 is mounted to the frame 100 and extends laterally thereacross. As shown in FIG. 4, the torsion control mechanism 210 is mounted to the frame 100 at an inward corner provided by the intersection of the lower support portion 102 and the rearward transverse member 108. A pair of web elements 212 may facilitate connection of the torsion control mechanism 210 to the frame 100.

Figure 5:
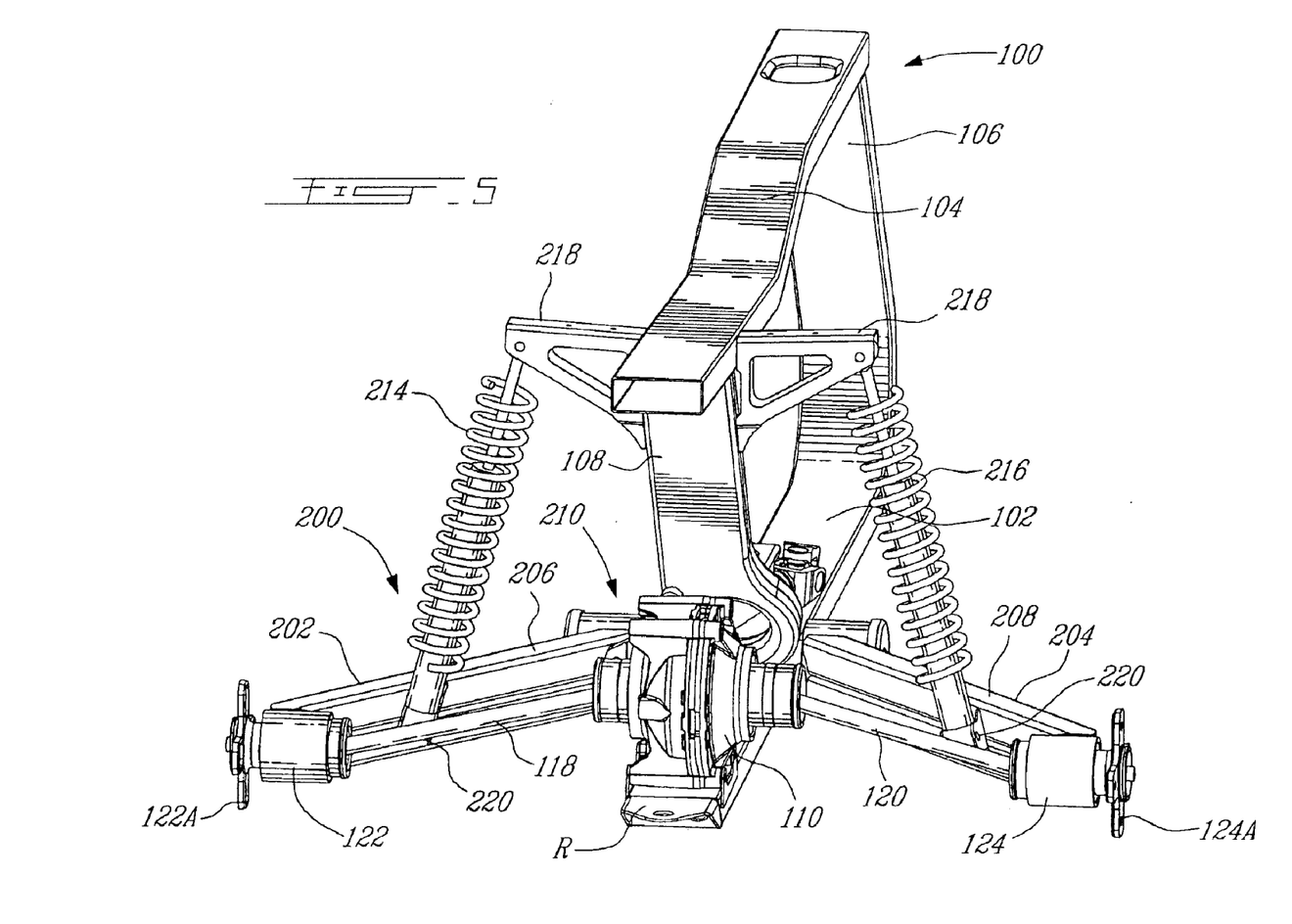
FIG. 5 is a rear perspective view of the suspension system shown in FIG. 4.

As shown in FIG. 5, the swing arms 206, 208 extend generally rearward and outwardly from the respective ends of the torsion control mechanism 210. It can be understood from the following description that the swing arms 206, 208 are pivotable about a pivot axis A (shown in FIG. 6) defined by the torsion control mechanism 210. Suspension travel is effected when forces on a wheel cause the corresponding swing arm to pivot about the pivot axis A such that the wheel moves generally vertically (in actuality, the wheel moves within an arc centered at the pivot axis A provided by the torsion control mechanism 210, such as shown in FIG. 7). The half shafts 118, 120 are coupled with the respective hubs 122, 124 and the differential 110 so that power from the engine may be transferred to the wheels. The universal joints and/or plunging joints allow the half shafts 118, 120 to maintain a power transferring relation between the differential 110 and the hubs 122, 124 through the full range of suspension travel.

The suspension system 200 also includes a pair of shock absorbers 214, 216, that are mounted to the frame 100 on one end thereof (e.g., via shock absorber hangers 218) and with the respective swing arm 206, 208 at the other end thereof. Hangers 220 may be used to facilitate connection between the shock absorbers 214, 216 and the swing arms 206, 208.

Figure 6:
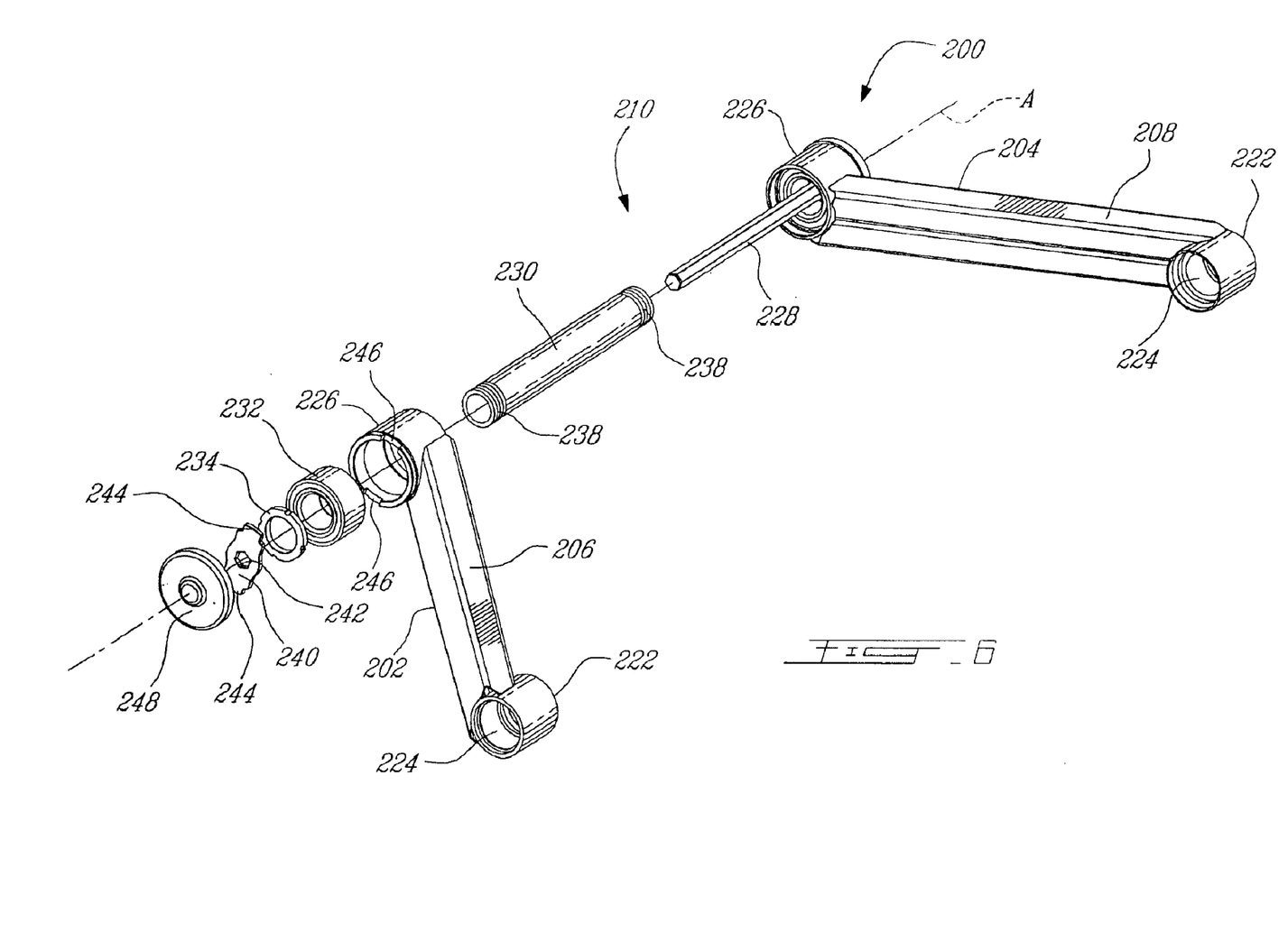
FIG. 6 is an exploded perspective view of the suspension system shown in FIG. 5.
Figure 7:
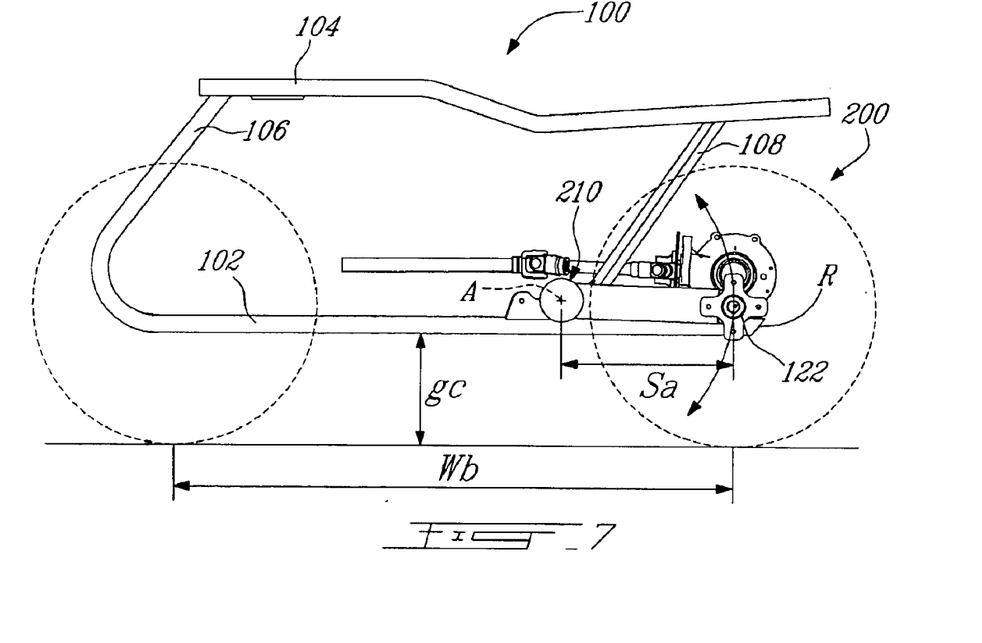
FIG. 7 is a schematic side view of a suspension system according to the principles of the present invention.

FIG. 6 shows the basic components of the suspension system 200. A rear housing 222 is connected at a rearward end of each swing arm 206, 208. The rear housing 222 enclose the hubs 122, 124 shown in FIG. 5. Each rear housing 222 is, e.g., a cylindrical structure with an inner surface 224 configured to cooperate with certain hub components such as seals or bearings, which allow the hubs to rotate within respective front housings. Additionally, a front housing 226 is connected to a forward end of each swing arm 206, 208. Like the rear housings 222, the forward housings 226, e.g., are cylindrical structures with inner surfaces described in further detail below.

It is contemplated that the swing arms 206, 208 may be formed of a hollow tubular member, such as steel or aluminum tubular stock. It is preferable that the rear and front housings 222, 226 be formed of material compatible (i.e., weldable) with that of the swing arms 206, 208. For example, a tubular steel member may be used for the swing arms 206, 208 while steel front and rear housings 226, 222 are welded to respective ends of the swing arm 206, 208. It is also contemplated that other materials and methods may be used to produce the swing arm assemblies 202, 204. For example, a metallic material (steel, aluminum, etc.) may be stamped or forged into configurations suitable for use as a swing arm assembly 202, 204. Other possibilities include composite materials, which may be molded to form suitable configurations to be used as a swing arm assembly. Other materials, methods, and configurations are, of course, possible with which the swing arm assemblies may be constructed.

In the embodiment shown in FIG. 6, the torsion control mechanism 210 utilizes a torsion bar 228 to link (i.e., couple) the swing arm assemblies 202, 204. As can be appreciated from FIGS. 4–6, the torsion bar 228 extends transversely across the frame 100 and within each of the front housings 226 at respective ends of the torsion bar 228. Additionally, the torsion control mechanism 210 includes a transversal arm 230. Referring back to FIG. 4, the transversal arm 230 extends across the width of the frame 100 such that ends thereof are disposed within respective front housings 226. The transversal arm 230 is rigidly mounted, e.g., via webs 212, to the lower portion 102 and transverse member 108 of the frame 100.

Figure 6A:
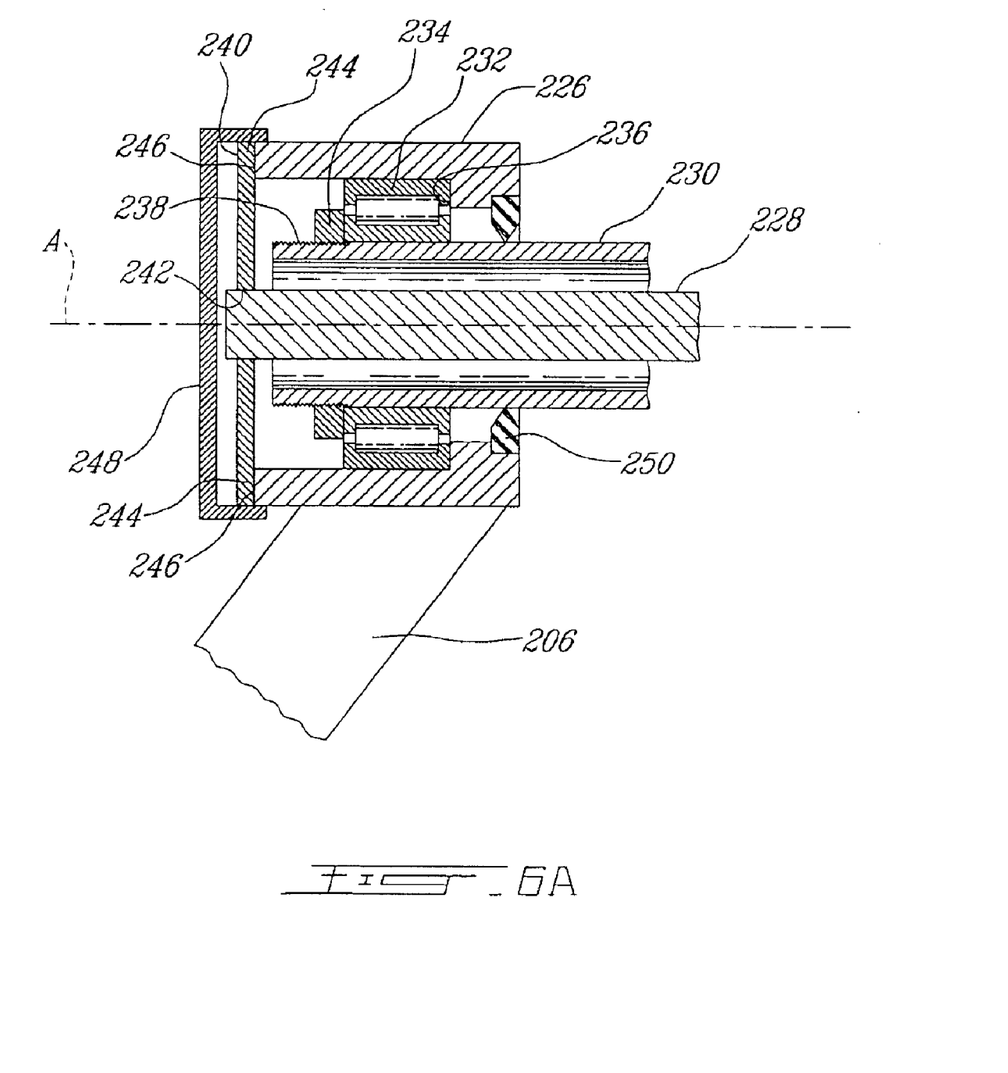
FIG. 6A is a partial cross-sectional view of a portion of the suspension system shown in FIG. 6.

Disposed within each front housing 226, in addition to the transversal arm 230 and torsion bar 228, is a bearing 232 and nut 234. As shown in FIG. 6A, an inner periphery of the bearing 232 is mounted on the transversal arm 230 adjacent an end thereof in a press-fit relation. It is contemplated that the inner surface of the front housings 226 may provide a shoulder 236 abutting the bearing 232 to provide lateral retainment of the bearing 232. An outer periphery of the bearing 232 is press-fit within the inner surface of the front housing 226. The nut 234 is threadedly engaged with a threaded end portion 238 of the transversal member 230.

It is noted that the torsion bar 228 is shown as a hexagonal solid member. A retaining member 240, shown in FIGS. 6 and 6A, is provided with a cooperating hexagonal opening 242. The hexagonal opening 242 is configured to non-rotatably cooperate with the torsion bar 228 (i.e., to allow the torsion bar 228 to be inserted within the opening 242, but prevent relative rotation between the torsion bar 228 and the retaining member 242). Additionally, the retaining member 240 includes a pair of key structures 244 that are engagable within corresponding notches 246 within an outwardly facing edge of the front housing 226. In this manner, the retaining member 240 is non-rotatably mounted to both the swing arm assembly 202 and the torsion bar 228. An end cap 248 is fastened to the outer most end of the front housing 226, perhaps by a threaded or frictional engagement therewith. A seal 250 (e.g., a lip seal) may be used within an inner most end of the front housing 226 between the inner periphery thereof and the outer periphery of the transversal member 230 to prevent dust, dirt, and debris from entering the inner periphery of the front housing.

It can thus be appreciated that the swing arms 206, 208 are pivotable about the transversal member 230 (about the pivot axis A shown in FIGS. 6 and 6A) with each other (i.e., as a pair) and are capable of pivoting relative to each other (i.e., singularly) due to an inherent torsional flexibility of the torsion bar 228.

In the embodiment of FIGS. 4–7, the left swing arm 206 is pivotably displaceable with respect to the right swing arm 208. Relative pivotal displacement is enabled by use of the torsion control mechanism 210. In the illustrated embodiment, the torsion control mechanism 210 includes the torsion bar 228. The torsion bar 228 may be made, for example, of SAE 4340 carbon steel, SAE 4140 steel or any other material that includes an appropriate amount of nickel and/or chromium and/or other elements to allow repeated twisting or torsional movement. Thus, when the left wheel encounters an obstacle, the left wheel may move, to a certain extent, independently with respect to the right wheel.

The left swing arm 206 may pivot with respect to the right swing arm 208 over a torsional deflection limit of the torsion bar 228, at which the torsion bar 228 is deflected sufficiently to develop a torsional stiffness, which then prevents further torsional deflection of the torsion bar 228 (and therefore prevents further independent movement of the swing arms 206, 208). It is preferable that the suspension system 200 is configured such that the torsional deflection limit lies within an elastic deformation limit of the torsion bar 228 so that the torsional deflection of the torsion bar 228 does not exceed the elastic deformation limit and cause plastic deformation of the torsion bar 228. It is also preferable to include suspension stops (not shown, but perhaps on the shock absorbers 214, 216 or on the frame 100), which prevent relative movement of the swing arms 206, 208 past the deflection limit of the torsion bar 228.

It is contemplated that the torsional deflection limit be, for example, about 5°–25° and preferably 5°–10°, as measured along the axis A of the torsion control mechanism 210. If the torsional deflection limit is reached, then any additional movement imparted to one of the swing arms 206, 208 will also cause movement of the other one of the swing arms 206, 208. Stated differently, the swing arms 206, 208 may move independently until about 5°–25° of separation is reached, and once the maximum separation is reached, the wheels and swing arms will move together, even if only one of the wheels encounters an obstacle or depression. For example, if the left wheel is in an extreme low position and the right wheel is at an extreme high position, any obstacle or depression that tends to cause further relative displacement of the right and left wheels will not be independently compensated for by the respective swing arm 206, 208. Thus, the relative movement between the left swing arm 206 and the right swing arm 208 is limited to provide a more even ride and comfort to the rider.

Additionally, the torsion control mechanism 210 acts as an integral stabilizer bar and, as such, reduces roll movement of the rear of the ATV.

One advantage of the suspension system of the invention is to provide at least some independent movement between the left and right wheels in order to overcome an obstacle. Accordingly, this means better comfort and ride to the rider, as compared to a rigid swing arm shown in FIG. 1. In addition, another advantage is to reduce the quantity of unsprung mass compared to prior art ATVs having a rigid swing arm suspension (see FIG. 1). Unsprung mass is that portion of mass that is not attached to the frame. With the left and right swing arms made of aluminum, the unsprung mass and overall mass of the vehicle can be further reduced.

Additionally, the suspension system according to the present invention is less expensive than independent suspension systems of the prior art. Each of the left and right swing arms 206, 208 may extend over a distance of about 15 inches as measured from the axis of the half shaft 118, 120 to the axis A of the torsion control mechanism 210.

Furthermore, to enable an ATV to travel rough, jagged terrain, the ATV should have a relatively large ground clearance. As indicated in FIG. 7 at gc, the term "ground clearance" refers to height above the ground at which the lower most ATV component (besides the wheels) is disposed. More specifically, the ground clearance describes the height above the ground at which the lower most sprung component is disposed. The suspension system of the present invention allows for the relatively high ground clearance by being arranged relative to the ATV such that the lower portion 102 of the frame provides the lower most sprung component of the ATV. In other words, it is preferable to position all sprung components above the lowest point of the lower portion 102 to provide the greatest ground clearance possible. For this reason, the torsion control mechanism 210 is positioned above the lowest point of the lower portion 102. As shown in FIG. 7 and described above, the torsion control mechanism 210 is mounted at an intersection of the lower portion 102 and the transverse member 108, in effect, above the lower portion 102. Furthermore, this arrangement positions the torsional control mechanism 210 interiorly of the frame 100. This arrangement ensures that the ATV will not experience hang-ups due to the torsion control mechanism 210 catching on terrain features. Additionally, a downwardly facing surface of the lower portion 102 may effectively act as, or be equipped with, a skid plate to both provide protection of the ATV componentry located above the surface and to provide a rigid surface that may contact and slide over high terrain features.

To allow for the relatively high ground clearance, the swing arms 206, 208 are formed to be relatively long. Also, the wheel base length for an ATV is preferably relatively short to maintain the high ground clearance while traversing terrain (to prevent high-centering of the ATV on high terrain features) and to provide a relatively compact vehicle arrangement. Additionally, long swing arms minimize the change in the wheel base length during wheel travel. Furthermore, an ATV with relatively shorter swing arms is disadvantageous, since the driveline tends to be relatively costly. In particular, since shorter half-shafts (necessitated by shorter swing arms) move through a greater angular range during suspension travel, the half-shafts must be manufactured to much greater precision to ensure proper operation of plunging joints between the half-shafts and the differential and respective hubs. The cost of the driveline may be significantly reduced by utilizing longer half-shafts (permitted by use of longer swing arms). The length of the swing arms 203, 208 may be expressed as a ratio relating to the wheel base length (R=sa/wb, wherein R=ratio of swing arm length to wheel base length; sa=swing arm length; and wb=wheel base length). It has been found that a ratio R of 0.2 to 0.4 is preferable for ATV application. In fact, a ratio R of 0.27 to 0.32 is ideal for some applications.

In operation, as seen from the rear of the ATV, the left and right swing arms 206, 208 move in a direction which is substantially perpendicular to the axis A defined by the torsion control mechanism 210. As seen from the side of the ATV, the wheels move along an arc centered on the axis of the torsion bar (see FIG. 7). Thus, if one of the wheels encounters an obstacle or depression during operation of the ATV, the wheel will move along a path in a plane that is substantially perpendicular to the axis A defined by the torsion control mechanism 210. This is advantageous because virtually the entire tread of the wheel stays in contact with the ground as the wheel moves along the arc defined by the swing arm, thereby improving traction. By contrast, a wheel of an ATV having a prior art double-wishbone suspension moves in a substantially arcuate path, as seen from the rear of the ATV, rather than a path within a substantially vertical plane.

The torsional control mechanism 210 is shown in the embodiment illustrated in FIG. 6 as including the torsion bar 228. As explained above, the torsion bar 228 allows relative pivotal movement between the swing arm assemblies 202, 204 about a longitudinal axis of the torsion bar 228 (i.e., the pivot axis A). The relative movement of the swing arm assemblies 202, 204 is provided by an inherent torsional flexibility of the torsion bar 228. At a point however, the relative movement between the swing arm assemblies 202, 204 is prevented by a flexural limit of the torsion bar 228. In other words, the relative torsional stiffness between the swing arm assemblies 202, 204, as well as the limit of relative movement therebetween, are dictated by the characteristics of the torsion bar 228 (i.e., those characteristics of the torsion bar affecting the torsional flexibility thereof). These characteristics include relative size, shape and material of the torsion bar. It is contemplated that these characteristics may be manipulated (i.e., adjusted or changed) to correspondingly change the handling characteristics of the ATV, such as by substituting one torsion bar having certain characteristic with a different torsion bar, having different characteristics, to thereby change the handling characteristics of ATV.

Figure 8:
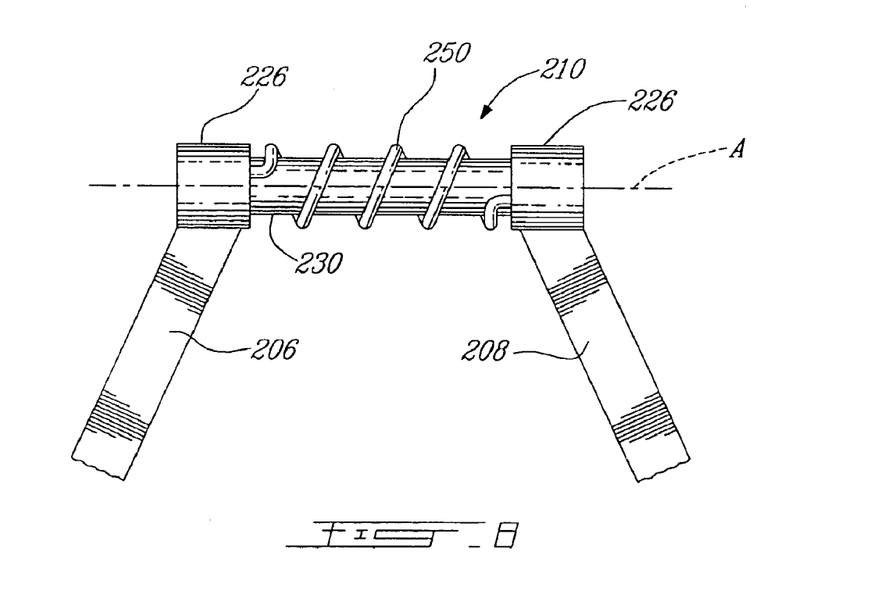
FIG. 8 is a top plan view of an alternate embodiment of the suspension system.

Furthermore, other embodiments of the torsional control mechanism 210 are contemplated. For instance, in lieu of a torsion bar, other torsionally flexible elements, such as a coil spring, indicated at 250 in FIG. 8, may be disposed within, or, as shown, coiled about an outer periphery of the transversal arm 230 and have ends rigidly connected to respective swing arms 206, 208. Similarly, as with the torsion bar 228, within a range of deflection of the coil spring 250, the swing arms 206, 208 are capable of relative pivotal movement therebetween about the pivot axis A. However when the spring 250 reaches a maximum deflection state, the swing arms 206, 208 are prevented from further relative pivotal movement and thus move dependently upon subsequent displacement of the wheel assemblies. Like the embodiment utilizing the torsion bar 228, the handling characteristics of the ATV may be altered by replacing the coil spring with a different spring having different characteristics, such as a different spring constant. Alternatively, a device may be provided capable of adjusting the displacement of the spring 250 (thereby altering the spring force produced by the spring), to thereby change the handling characteristics of the ATV.

Figure 9A:
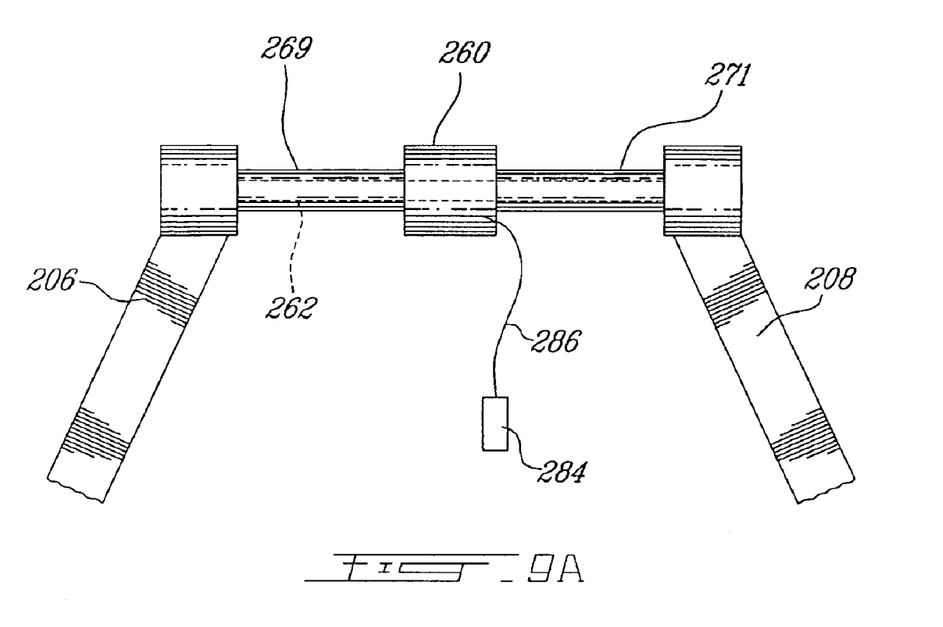
FIGS. 9A and 9B are top plan views of suspension systems according to additional embodiments of the present invention.

It is also contemplated that the torsional control mechanism 210 may include a damping device 260, such as shown in FIG. 9A, that is disposed between and coupled to respective swing arms 206, 208 along a split member (which may be a torsion bar) providing link arms 269, 271. The damping device 260 may be used in addition to or in lieu of the torsion bar or coil spring embodiments described above. The damping device 260 may be adjustable such that a coupling (i.e., dependency) of the swing arms 206, 208 is variable. This adjustment of the dependency of the suspension system is advantageous since desired handling characteristics for one terrain situation or one rider may not be suitable or comfortable for another terrain condition or rider.

As shown, the link arms 269, 271 extend between the swing arms 206, 208 and connect to the damping device 260. It is also contemplated that a torsion bar 262 (similar to the torsion bar 228) may extend between and connect to each swing arm 206, 208. FIG. 9A shows the torque bar 262 disposed within (such as within a hollow central portion of the link arms 209, 271) the link arms 269, 271 and the damping device 260. With the arrangement shown in FIG. 9A, the damping device 260 may selectively uncouple the link arms 269, 271 such that a degree of independent movement between the swing arms 269, 271 is limited to the torsional deflection limit of the torsion bar 262 (as discussed above with relation to the torsion bar 228), or couple the link arms 269, 271 to one another such that the swing arms 206, 208 move dependently. It is noted, however, that the nature of the link arms 269, 271 may inherently provide, at least, a small degree of torsional deflection (even if link arms 269, 271 are substantially rigid). Therefore, the rigidity, i.e., dependency, between the swing arms is provided by both the rigidity of the coupled link arms 269, 271 themselves, and of the torsion bar 262 (which may have a degree of rigidity).

Figure 9B:
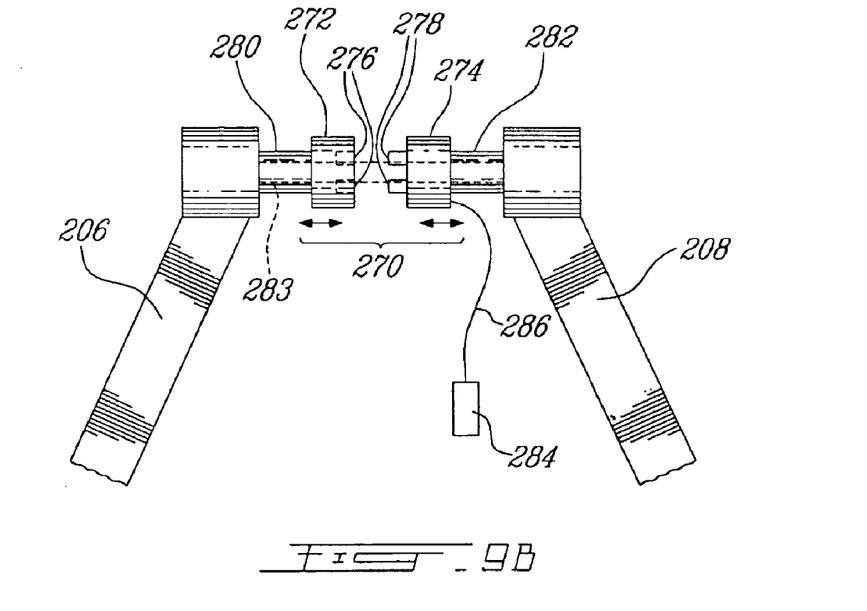

FIG. 9B shows an embodiment of a clutch assembly at 270. The clutch assembly 270 includes clutch members 272, 274 providing opposing interlocking structures 276, 278, respectively. The clutch members 272, 274 may be moved to move the interlocking structures 276, 278 between an interlocked, non-rotating engagement (corresponding to 100% dependency) and a spaced relation (corresponding to 0% dependency). The clutch members 272, 274 may be coupled to the respective swing arms 206, 208 with link arms 280, 282, respectively, similar to the embodiment shown in FIG. 9A. Alternatively, it is contemplated that the link arms 280, 282 may be torsionally flexible. In this manner, when the clutch members 272, 274 are non-rotatably engaged (via interlocking structures 276, 298) the swing arms 206, 208 may be capable of relative pivotal movement from 0% to 100% dependency therebetween. With this arrangement, the clutch assembly 270 may selectively disengage the clutch members 272, 274 such that the swing arms 206, 208 may move fully independently or may selectively engage the clutch members 272, 274 such that the swing arms 206, 208 may move independently within a range provided by the torsional deflection limit of the coupled link arms 280, 282.

Alternatively, it is contemplated that the link arms 280, 282 may be relatively rigid. In this case, it may be preferable to provide a torsion bar 283, similar to torsion bar 262 described above. The torsion bar 283 extends between and connects to the swing arms 206, 208 and is disposed within the link arms 280, 282. In this manner, when the clutch members 272, 274 are disengaged, the swing arms 206, 208 have a degree of independent movement provided by the torsion bar 283 (as discussed above with reference to torsion bar 228) and when the clutch members 272, 274 are engaged, the swing arms 206, 208 move virtually dependently. However, as discussed in reference to the embodiment of the invention shown in FIG. 9A, the link arms 280, 282 may have a degree of inherent torsional deflection, even if substantially rigid.

For either embodiment shown in FIGS. 9A and 9B, it is contemplated that clutch assemblies 260, 270 may be manually controllable to thereby vary the dependency of the suspension system, as discussed above. In particular, the clutch assemblies 260, 270 may include an actuator 284 to allow the rider to adjust the dependency of the suspension system on-the-fly. In other words, by manipulation of the actuator 284, a rider would be able to adjust the dependency of the suspension system without stopping the ATV or dismounting from it. Contemplated actuators include hydraulic actuators, electromagnetic actuators, and mechanical linkages (shown schematically in FIGS. 9A and 9B at 286). It is also contemplated that a control system may be provided to automatically adjust the dependency between the swing arms 206, 208 to compensate for certain driving conditions, such as traversing rough terrain or a sharp or sustained turn.

The suspension system embodiment shown in FIGS. 4–7 is shown as having the torsion bar 228, which has a polyagonal cross-sectional geometry (shown with a hexagonal shape in FIG. 6). It is contemplated that the cross-sectional geometry may, alternatively, be any non-circular shape (such as square, ovular, etc.). In the case that another shape is used (other than the hexagonal shape shown) the retaining member 240 may be correspondingly altered by providing the opening 242 with a cooperating shape to maintain the non-rotational relation between the torsion bar 228 and the retaining member 240. Alternatively, other arrangements are contemplated to provide a non-rotating relation between the torsion bar and the respective swing arms.

Figures 10, 10A:
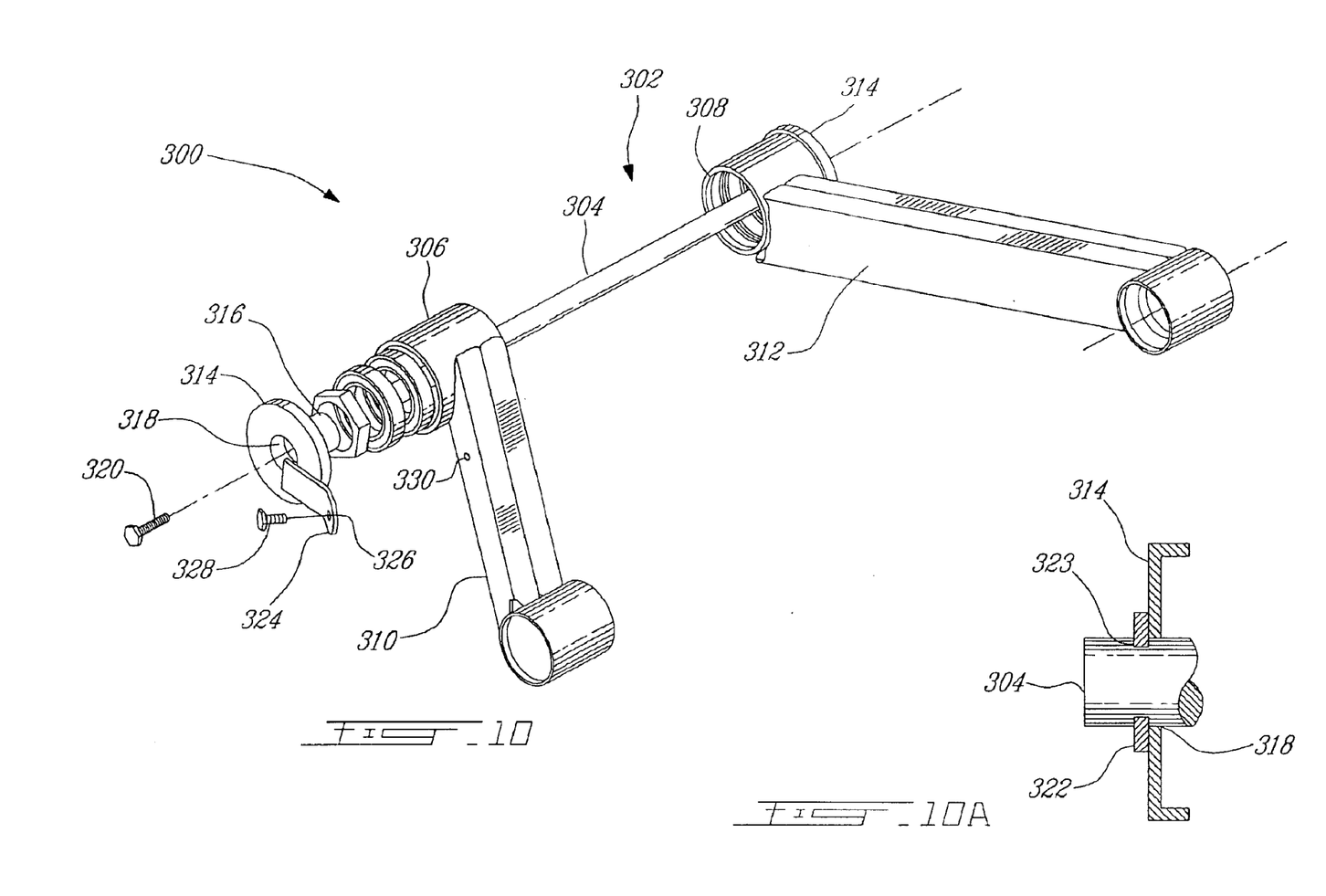
FIG. 10 is an exploded perspective view of a suspension system according to another preferred embodiment of the present invention.
FIG. 10A is a cross-sectional view of the connection between a torsion bar and a flange cover according to a preferred embodiment of the present invention.

For example, another embodiment of the suspension system is shown at 300 in FIG. 10. As shown, a torsion control mechanism 302 may include a torsion bar 304 with a circular cross-sectional geometry.

The torsion bar 304 passes through front housings 306, 308 of each of left and right swing arms 310, 312. A flange cover 314 includes an extension 316 adapted to receive the end of the torsion bar 304, which may have a splined or polygonal cross sectional shape, e.g., a hexagon, or as shown, may be circular. The extension 316 includes an interior portion having a shape that is complementary to the shape of the torsion bar 304.

A flange cover 314 is provided to the outer sides of each front housing 306, 308. Each flange cover 314 includes an aperture 318 through which a bolt 320 extends. The bolt 320 includes exterior threads that engage with interior threads (not shown) formed in the end of the torsion bar 304. Alternatively, the torsion bar 304 may extend outwardly from the aperture 318 and be retained with a circlip 322 disposed within a groove 323, as shown in FIG. 10A.

Referring back to FIG. 10, the flange cover 314 includes a lever 324 including an aperture 326 for receiving a bolt 328. The bolt 328 passes through the aperture 326 of the lever 324 and engages with an aperture 330 provided on an outer side of each of the swing arms 310, 312.

Figure 11:
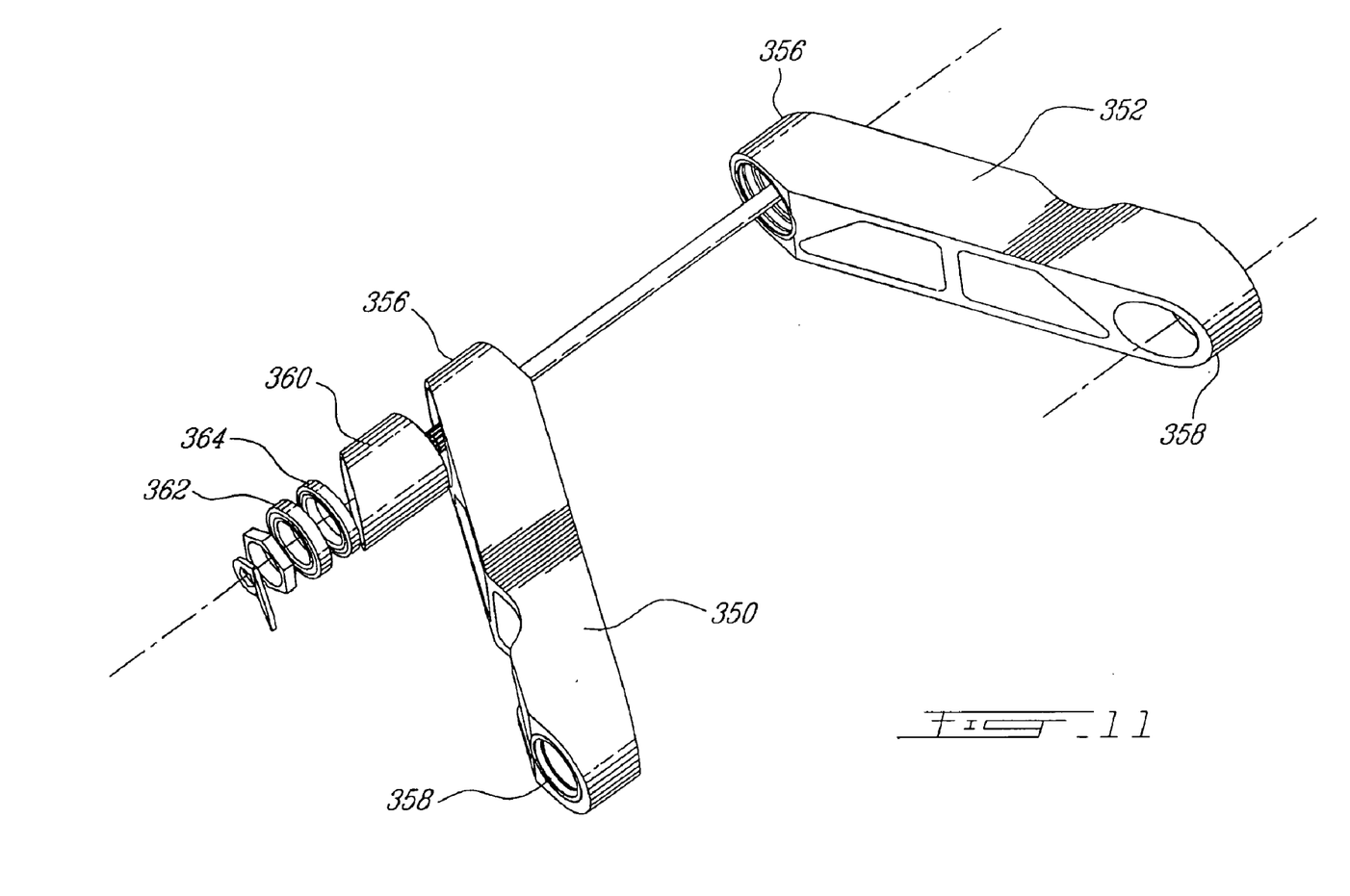
FIG. 11 is an exploded perspective view of a suspension system according to yet another preferred embodiment of the present invention.
Figure 12:
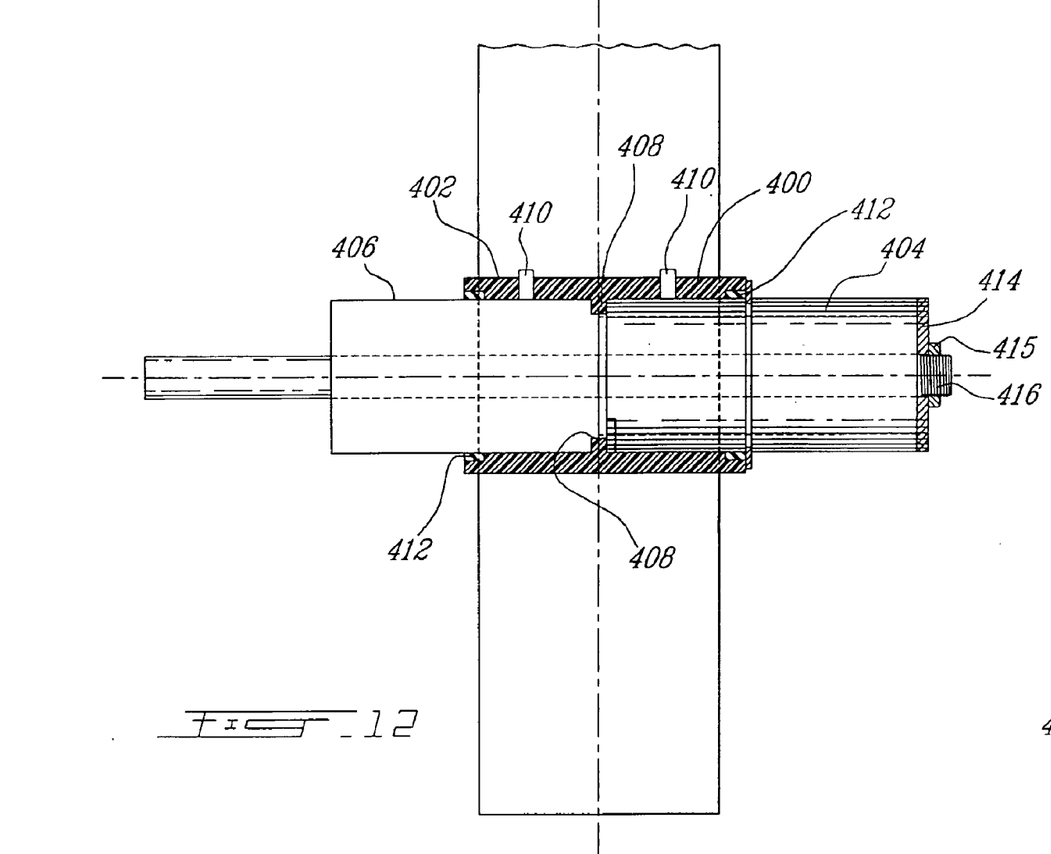
FIG. 12 is a top plan view of a suspension system according to another preferred embodiment of the present invention.

Another embodiment, shown in FIG. 11, is substantially similar to that embodiment shown in FIG. 10. Left and right swing arms 350, 352 may be formed of aluminum as a single unit with the front and rear housings 350, 358. In FIG. 12, a steel sleeve 360 is provided to be slidably received within the front housing 356. Bearings 362, 364 are press-fit into the steel sleeve 360, rather than the aluminum housing 356. The function of the bearings is to allow relative pivotal movement between the swing arms and the transversal arm, while also transferring load to the front from the suspension system. Also, the embodiment of FIG. 11 does not include a flange cover as does the embodiment of FIG. 11.

In yet another embodiment, bearings providing for the pivotal movement of the swing arms can be eliminated and replaced with one or more bushings. As shown in FIG. 12, bushings 400, 402 are welded to the lower portion 102 of the frame 100 (see FIG. 4). The bushings 400, 402 can be combined into a single bushing accommodating both of the swing arms. A tube 404 connected to the right swing arm fits within the bushing 400. A tube 406 connected to the left swing arm fits within the bushing 402. The bushings 400, 402 are provided with shoulders 408 that engage ends of the tubes 404, 406. Grease fittings 410 are provided on the bushings 400, 402, and seals 412 are provided between the bushings 400, 402 and the tubes 404, 406. Each tube 404, 406 is provided with a cap 414 that fits over a torsion bar 416. The cap 414 is secured using a nut or a circlip 415.

Figure 13:
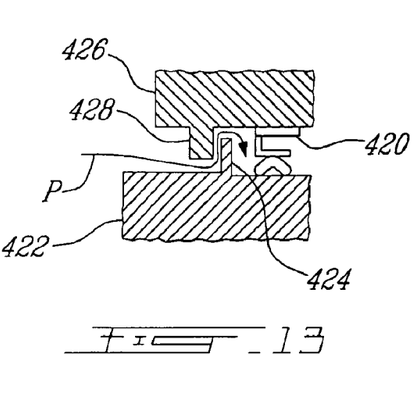
FIG. 13 is a cross-sectional view of a structure for helping prevent dust from reaching the seal according to another embodiment of the invention.

In either embodiment shown in FIGS. 10 and 11, the inside portion of each of the front housings 306, 305 and 356 include a lip seal 420. To improve the sealing system, a special structure may be employed to minimize the amount of dust, mud and water that can reach the seal 420. As shown in FIG. 13A, a transversal arm 422 is provided with an extension 424 adjacent the seal 420, and a front housing 420 is provided with an extension 428. The extensions 424, 428 define a tortuous path P that helps prevent dust, dirt, and debris from reaching the seal 420.

Similarly, as with the embodiment shown in FIGS. 4–7, the swing arms 310, 312 and 350, 352 of the embodiments shown in FIGS. 10 and 11, respectively, may be formed of a variety of suitable materials by many suitable methods. For example, the swing arms may be formed by welding steel or aluminum tubular stock to front and rear housings formed of compatible material. Conversely, the swing arms may be formed by stamping, forging, or casting metallic material (e.g., steel or aluminum) into a suitable configuration. Furthermore, the swing arms may be formed, at least in part, by a molded composite material. Of course, other materials and methods may be utilized.

While preferred embodiments of the invention have been shown and described, it is evident that variations and modifications are possible within the spirit and scope of the preferred embodiments described herein. For example, while the suspension system has been described in relation to the rear of an ATV, it is evident that the suspension could be used for the front wheels of an ATV, or for vehicles other then ATVs.

What is claimed is:

1. An all-terrain vehicle, comprising:
    a frame;
    a suspension system coupled to the frame, the suspension system including:
        a hollow transversal member rigidly mounted to the frame,
        a left swing arm and a right swing arm, each swing arm pivotally connected to the transversal member at opposite ends thereof, both swing arms pivoting about an axis defined by the transversal member, and
        a torsion bar disposed inside the transversal member and connected to each swing arm at opposite ends of the torsion bar,
        each of the left and right swing arms comprising a housing through which the torsion bar extends.

2. An all-terrain vehicle according to claim 1, wherein the left and right swing arms are made of steel.

3. An all-terrain vehicle according to claim 1, wherein the left and right swing arms are made of aluminum.

4. An all-terrain vehicle according to claim 1, wherein each swing arm is capable of pivotal movement about the axis relative to the other swing arm.

5. An all-terrain vehicle according to claim 4, wherein a maximum angle of relative pivotal displacement of the left swing arm with respect to the right swing arm is about 5°–25°.

6. An all-terrain vehicle according to claim 5, wherein the maximum angle of relative pivotal displacement is about 5°–10°.

7. An all-terrain vehicle according to claim 5, wherein, if the maximum angle of displacement is reached, movement of one of the left and right swing arms beyond about 5°–25° will cause movement of the other one of the right and left swing arms.

8. An all-terrain vehicle according to claim 1, wherein the suspension system comprises a damping device coupled to each of the left and right swing arms.

9. An all-terrain vehicle according to claim 8, wherein the torsion bar extends within the damping device.

10. An all-terrain vehicle according to claim 1, wherein the suspension system comprises a clutch assembly coupled to each of the left and right swing arms.

11. An all-terrain vehicle according to claim 10, wherein the torsion bar extends within the clutch assembly.

12. An all-terrain vehicle according to claim 10, wherein the clutch assembly comprises a pair of clutch members coupled to respective swing arms.

13. An all-terrain vehicle according to claim 12, wherein each of the clutch members comprises a respective interlocking structure cooperable with the interlocking structure of the other clutch member, at least one of the pair of clutch members being movable relative to the other clutch member such that the interlocking structures are movable between an interlocked, non-rotating relation and a spaced relation.

14. An all-terrain vehicle according to claim 1, wherein the left swing arm and the right swing arm are generally transverse to the torsion bar.

15. An all-terrain vehicle according to claim 1, further comprising a flange cover coupled to an outer side of each housing, each flange cover being connected to an end of the torsion bar.

16. An all-terrain vehicle according to claim 1, wherein each of the left and right swing arms is capable of relative pivotal movement about the axis relative to the other of the swing arms through a range of pivotal movement defined by a torsional deflection limit of the torsion bar.

17. An all-terrain vehicle according to claim 16, wherein the torsional deflection limit of the torsion bar is within an elastic deformation limit of the torsion bar.

18. An all-terrain vehicle according to claim 1, further comprising a differential mounted on the frame, the differential being coupled to the left swing arm and the right swing arm using half shafts including one of plunging joints and universal joints.

19. An all-terrain vehicle according to claim 18, wherein each of the left and right swing arms comprises a rear housing having an inner side to which a respective one of the left and right half shafts is coupled.

20. An all-terrain vehicle according to claim 19, wherein each rear housing comprises an outer side to which a respective one of left and right wheels is coupled.

21. An all-terrain vehicle according to claim 1, wherein the torsion bar is transverse to the driving direction of the vehicle.

22. An all-terrain vehicle according to claim 1, further comprising a shock absorber connection member provided on each of the left and right swing arms.

23. An all-terrain vehicle according to claim 1, wherein the frame comprises:
   a first frame member;
   a second frame member;
   at least a first cross member and a second cross member extending between the first and second frame members to thereby define a closed perimeter with an engine receiving space therein; and
   first and second suspension mounting points associated with at least one of the first frame member, the second frame member, the first cross member, and the second cross member,
   wherein at least one of the first frame member and the second frame member is positioned substantially along a longitudinal centerline of the frame and extends from the first suspension mounting point to the second suspension mounting point.

24. An all-terrain vehicle according to claim 23, wherein the first member is vertically aligned with the second frame member.

25. An all-terrain vehicle according to claim 23, wherein each of the first and second frame members and the first and second cross members has a uniform cross section throughout a length thereof.

26. An all-terrain vehicle according to claim 23, wherein each of the first and second frame members and the first and second cross members has an identical cross-sectional shape.

27. An all-terrain vehicle according to claim 23, wherein one of said first and second frame members is bent toward the other of the first and second frame members proximate one end thereof to thereby provide one of the first and second cross members.

28. An all-terrain vehicle according to claim 23, further comprising a rear suspension mounting structure rigidly mounted to one of the first and second suspension mounting points.

29. An all-terrain vehicle according to claim 23, wherein each of the first and the second frame members consists essentially of a single beam.

30. An all-terrain vehicle according to claim 23, wherein at least one of the first and second frame members consists essentially of a single beam.

31. An all-terrain vehicle according to claim 30, wherein the single beam comprises a closed tubular structure.

32. An all-terrain vehicle according to claim 1, further comprising a pair of front wheels mounted on the frame and pair of rear wheels, one of the rear wheels mounted to each of the left and the right swing arms, and a wheelbase defined between the front wheels and the rear wheels, and wherein each swing arm has a length and a ratio of the swing arm length to the wheelbase ranges from 0.20 to 0.40.

33. An all-terrain vehicle according to claim 32, wherein the ratio of the swing arm length to the wheelbase ranges from 0.27 to 0.32.

34. An all-terrain vehicle according to claim 1, wherein the axis of the swing arms is disposed above a lower most portion of the frame.

35. An all-terrain vehicle according to claim 1, wherein the suspension system further comprises a bearing between the front housing and the transversal member.

36. An all-terrain vehicle according to claim 1, wherein the suspension system further comprises a bushing between the front housing and the transversal member.

37. An all-terrain vehicle according to claim 1, wherein the torsion bar has a polygonal section.

38. An all-terrain vehicle according to claim 37, further comprising a retaining member having an opening, the torsion bar be inserted in the retaining member opening, whereby the polygonal shape of the torsion bar prevents relative rotation between the torsion bar and the retaining member.

39. An all-terrain vehicle according to claim 38, wherein the front housing further comprises a notch in an edge, and the retaining member further comprises a key structure engaging the notch.

40. An all-terrain vehicle according to claim 1, wherein the torsion bar is subjected only to pivotal forces from the swing arms.

* * * * *